United States Patent
Weichenberger et al.

(10) Patent No.: US 8,706,377 B2
(45) Date of Patent: Apr. 22, 2014

(54) CONTROL DEVICE AND METHOD FOR THE CONTROL OF FUNCTIONS

(75) Inventors: Lothar Weichenberger, Klingmoos (DE); Franz Obesser, Indersdorf (DE)

(73) Assignee: Autoliv Development AB, Vargarda (SE)

( * ) Notice: Subject to any disclaimer, the term of this patent is extended or adjusted under 35 U.S.C. 154(b) by 882 days.

(21) Appl. No.: 12/375,758

(22) PCT Filed: Jul. 27, 2007

(86) PCT No.: PCT/EP2007/006680
§ 371 (c)(1),
(2), (4) Date: Sep. 11, 2009

(87) PCT Pub. No.: WO2008/014940
PCT Pub. Date: Feb. 7, 2008

(65) Prior Publication Data
US 2010/0023199 A1 Jan. 28, 2010

(30) Foreign Application Priority Data

Aug. 2, 2006 (DE) .......................... 10 2006 036 356

(51) Int. Cl.
*B60T 8/88* (2006.01)
*G06F 19/00* (2011.01)

(52) U.S. Cl.
USPC .................. 701/76; 701/39; 701/43; 701/62; 701/92; 701/97; 701/107; 714/708; 708/530; 340/507

(58) Field of Classification Search
USPC ............. 702/183; 137/85; 318/594, 602, 562; 709/250, 219; 701/49, 296, 33, 36, 29, 701/43, 62, 76, 92, 97, 107; 708/530; 340/507

See application file for complete search history.

(56) References Cited

U.S. PATENT DOCUMENTS

| | | | |
|---|---|---|---|
| 6,484,082 B1 * | 11/2002 | Millsap et al. | 701/48 |
| 6,633,800 B1 * | 10/2003 | Ward et al. | 701/2 |
| 7,005,821 B2 * | 2/2006 | Sunaga et al. | 318/594 |
| 7,525,254 B2 * | 4/2009 | Lys et al. | 315/77 |
| 7,684,026 B2 * | 3/2010 | Rogers et al. | 356/139.09 |
| 7,899,938 B1 * | 3/2011 | Fernandez et al. | 709/250 |
| 2001/0003806 A1 * | 6/2001 | Swan et al. | 701/49 |
| 2003/0193799 A1 * | 10/2003 | Bohler | 362/240 |
| 2004/0232872 A1 * | 11/2004 | Sunaga et al. | 318/652 |
| 2006/0106578 A1 * | 5/2006 | Yamada et al. | 702/183 |
| 2009/0027662 A1 * | 1/2009 | Rogers et al. | 356/139.09 |
| 2010/0023199 A1 * | 1/2010 | Weichenberger et al. | 701/29 |

FOREIGN PATENT DOCUMENTS

| | | |
|---|---|---|
| DE | 198 00 311 | 7/1999 |
| DE | 198 33 462 | 1/2000 |
| DE | 101 23 802 | 12/2002 |
| DE | 102 33 503 | 2/2004 |
| DE | 102 36 080 | 2/2004 |
| DE | 10 2004 032 405 | 2/2006 |
| DE | 10 2005 030 770 | 3/2006 |

* cited by examiner

*Primary Examiner* — Ronnie Mancho
(74) *Attorney, Agent, or Firm* — Brinks Gilson & Lione

(57) ABSTRACT

A controller system in which a plurality different main functions are integrated includes a plurality of microcontrollers. Each of the microcontrollers is associated with one of the main functions. At least one monitoring unit is implemented for the plurality of the main functions, for example a brake monitor and a comfort monitor. When the at least one monitoring unit detects a defect of a main function in the controller, only the defective main function is deactivated.

13 Claims, 4 Drawing Sheets

CONTROL DEVICE AND METHOD FOR THE CONTROL OF FUNCTIONS

CROSS REFERENCE TO RELATED APPLICATIONS

This application claims priority to German patent application number 10 2006 030356.6, filed Aug. 2, 2006 and PCT/EP2007/006680, filed Jul. 27, 2007.

FIELD OF THE INVENTION

The invention relates to an electrical controller in which different functions are integrated, with microcontrollers being associated with the different functions. The invention further relates to a method for the integrative control of different functions. Such controllers and control methods can be used, for example, in the automotive industry, but also in other industrial areas.

BACKGROUND OF THE INVENTION

Corresponding demands on availability and safety must be satisfied in the integration of functions into an electronic controller. One criterion for this is the degree of diagnosis and defect tolerance. If two different functions are integrated in a controller, for example an automotive braking system and a comfort system, the systems must achieve at least the same performance as separate systems provide. This means that, in the simplest case, the redundancies and error monitoring processes of both systems must be effective.

In an example of a prior art system, both the braking system and the comfort system each have two microcontrollers, four units in total. However, this is associated with substantial space requirements. Furthermore, the development risk increases due to the complexity of the arrangement. The costs for this arrangement are also comparatively high.

A controller known from DE 198 00 311 A1 includes two microcontrollers between which a synchronous comparison of the data takes place. On recognition of an inconsistency in one of the microcontrollers, the defect is recognised by the system and the total system is put into a safe state or is shut down.

So-called master-slave concepts are known from DE 10 2005 030 770 A1, for example. A check is made out diversely redundantly in these concepts. On an inconsistency, the system response is also moved to a safe state (e.g. prevented) or is shut down.

It is disadvantageous in these previously known systems that, on the recognition of a defect, the complete system is completely shut down so that functions free of defects are also no longer functional.

In an alternative system, a controller is known from DE 10 2004 032 405 A1 which can be used for space and in which three or more microcontrollers are used. A majority decision taking is carried out in this controller. However, the system is made up of a number of components and is not suitable for application in motor vehicles due to its complex design. The high system costs also stand in the way of its application in motor vehicles.

It is therefore the object of the present invention to provide a controller with a defect free system which has a less complicated design than prior art systems and which does not result in the complete shut down of the total system on a defect recognition.

It is additionally the object of the present invention to provide a method for the integrative control of a plurality of functions in a defect-free system which is less complex and/or expensive in comparison with the prior art.

SUMMARY OF THE INVENTION

The above objects are solved in accordance with the present invention. The system includes a controller, in which different functions are integrated, a separate microcontroller is associated with each of the functions. In accordance with the invention, a monitoring unit is provided which is implemented for a plurality of functions. In the case of a defect recognition in the controller, only the defective function is shut down in accordance with the present invention. It is thus ensured, despite the combination of a plurality of functions in one controller, that, on corresponding defect recognition, the total controller does not immediately have to be shut down for all functions.

The monitoring unit in accordance with this invention can accordingly be arranged outside the microcontroller associated with the function.

The microcontrollers advantageously check their functions mutually, with the checking units being arranged on the respective microcontroller. Reciprocal checking units can additionally also be provided outside the microcontrollers in addition to these integrated checking units.

A diagnostic unit may be additionally provided which carries out a dedicated error analysis and error treatment. In this case, on the occurrence of a corresponding defect in one of the functions, they can first be deactivated. On a corresponding diagnosis by the diagnostic unit, however, the defect may be recognised as remediable and may subsequently be remedied. The previously impaired function can thus be activated again after a corresponding defect remedy.

The diagnostic unit can advantageously be associated with the monitoring unit. In this respect, the diagnostic unit can be specifically associated with the microcontrollers of the functions.

In accordance with an advantageous embodiment variant of the present invention, the first function relates to an active safety system of a vehicle and the second function relates to a passive safety system of a vehicle. In this respect, for example, the first function can be related to a braking or stability system, whereas the second function is related to an occupant protection device, for example to an airbag or to a seat belt restraint system.

In another advantageous embodiment of the present invention, a plurality of functions of an active safety system of a vehicle are integrated. Alternatively, a plurality of functions of a passive safety system of a vehicle can also be integrated.

Finally, in accordance with a further advantageous embodiment of the invention, at least one function of a telematics system of a vehicle can be integrated with at least one function of a passive safety system of a vehicle and/or active safety system of a vehicle.

The aforesaid objects are also solved in accordance with the invention by a method for the integrative control of different functions. A microcontroller is also associated with respective individual functions in the methods described herein. The respective functions are monitored by at least one monitoring unit which is implemented for a plurality of functions, with in the case of a defect recognition, the function in the controller only being reduced by the damaged function or damaged functions. The defective function can optionally advantageously be repaired by a diagnostic system and subsequently activated again.

Further features, details and advantages of the invention result from the embodiments shown in the drawing. There are shown:

DETAILED DESCRIPTION OF THE INVENTION

Figure 1:
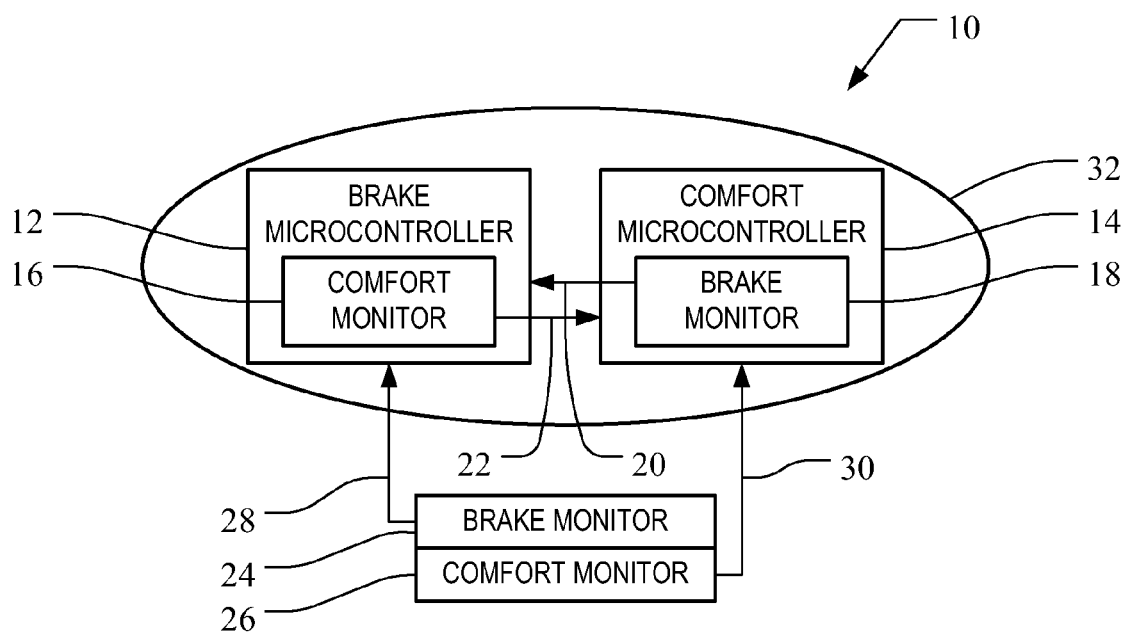
FIG. 1 is a schematic representation of the design of a controller in accordance with a first embodiment of the invention.

A controller system 10 is shown schematically in FIG. 1 in which different functions are respectively realised by a microcontroller. The two main functions which are each assigned to a separate microcontroller here are, on the one hand, the main function of braking provided by microcontroller 12 and, on the other hand, the main function of comfort provided by microcontroller 14. In this respect, it is only one example taken from the plurality of possible mutually associated main functions. The main functions provided by microcontrollers 12 and 14 can theoretically also be identical. In the embodiment of FIG. 1, respective monitor units 16 and 18 are implemented in each microcontrollers 12 and 14 which respectively monitor the function of the other microcontroller. The monitor unit 16 for the checking of the comfort function is thus integrated in the braking microcontroller 12. It is indicated by the arrow 22 in FIG. 1 that monitor unit 16 for the checking of the comfort monitors the comfort microcontroller 14. Conversely, the monitor unit 18 for the checking of the brake function 26 is integrated in the comfort microcontroller 14. It is illustrated by the corresponding arrow 20 in FIG. 1 monitor unit 18 for the checking of the brake function monitors the microcontroller 12 with which the brake function is associated. External monitor units 24 and 26 are additionally present in the controller system 10 in accordance with FIG. 1. Brake monitor unit 24 serves the checking of the brake microcontroller 12 (shown by an arrow 28), and comfort monitor unit 26 is for the checking of the comfort microcontroller 14 (shown by the arrow 30). A redundant monitoring system for the functions is thus also provided.

Figure 2:
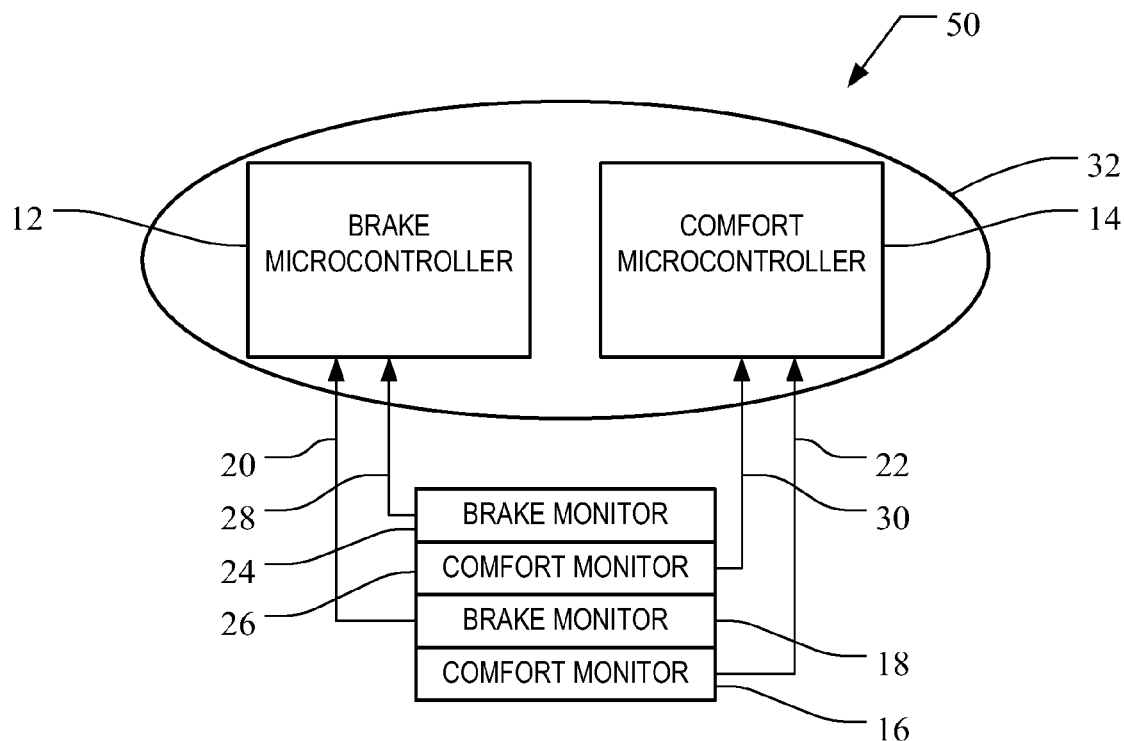
FIG. 2 is a schematic representation of a second embodiment variant in accordance with the present invention.

In an alternate embodiment of a controller system 50 shown in FIG. 2, the monitor units 16 and 18 are moved to outside the two microcontrollers 12 and 14 for braking and control takes and could be provided, for example, by a third microcontroller, an external system or another realisation such as an ASIC. The availability of the system can be increased by the "double monitoring" since the failure probability of the monitoring function is smaller than that of an individual monitoring unit. The arrows 20, 22, 28, and 30 indicate that the monitors operate in the manner described with respect to FIG. 1.

Figure 3:
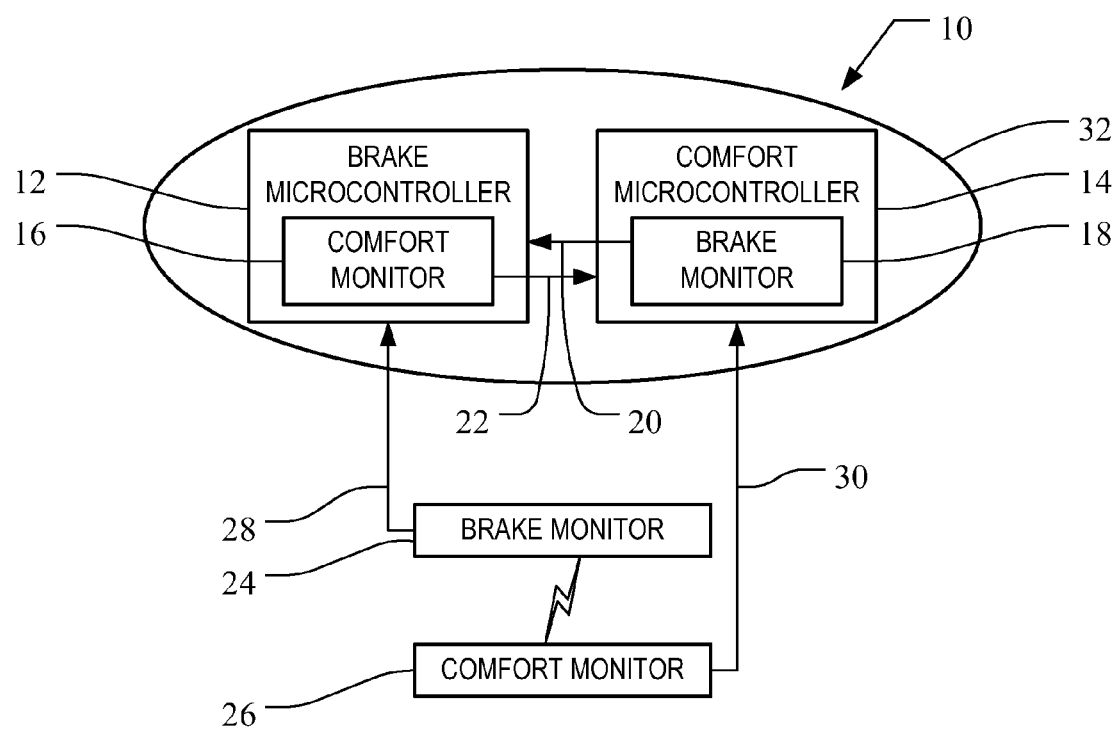
FIG. 3 is an embodiment variant in accordance with FIG. 1 in a first defect case.

FIG. 3 shows the principle of the controller system 10 in accordance with FIG. 1. It is here indicated by the representation of the lightning arrows that a defect has occurred in an external monitor unit 24 or 26. It is shown graphically in the illustration by the elliptical border 32 of the system 10 consisting of the two microcontrollers 12 and 14 that the main functions of the controllers can still be operated safely since at least one correct monitoring unit 16, 18, 24, or 26 is still present for the respective main functions. Thus, ellipse 32 throughout the figures designates the failure free components of the system. Known methods which do not have to be explained in any more detail at this point can be made use of for the recognition of the defective monitoring unit.

Figure 4:
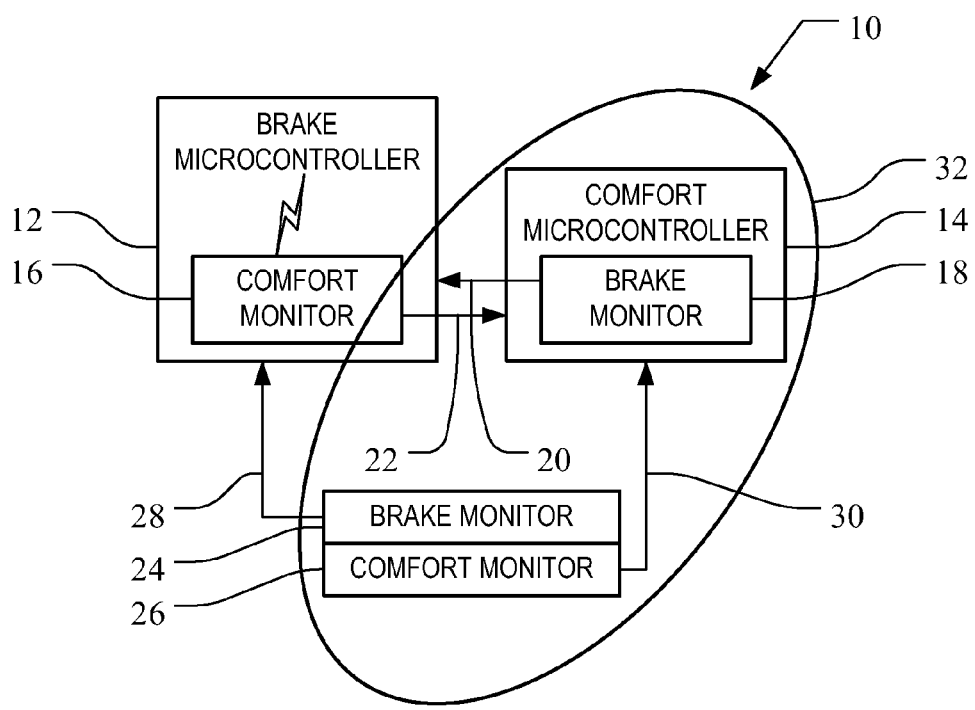
FIG. 4 is an embodiment variant in accordance with FIG. 1 in a second defect case.
Figure 5:
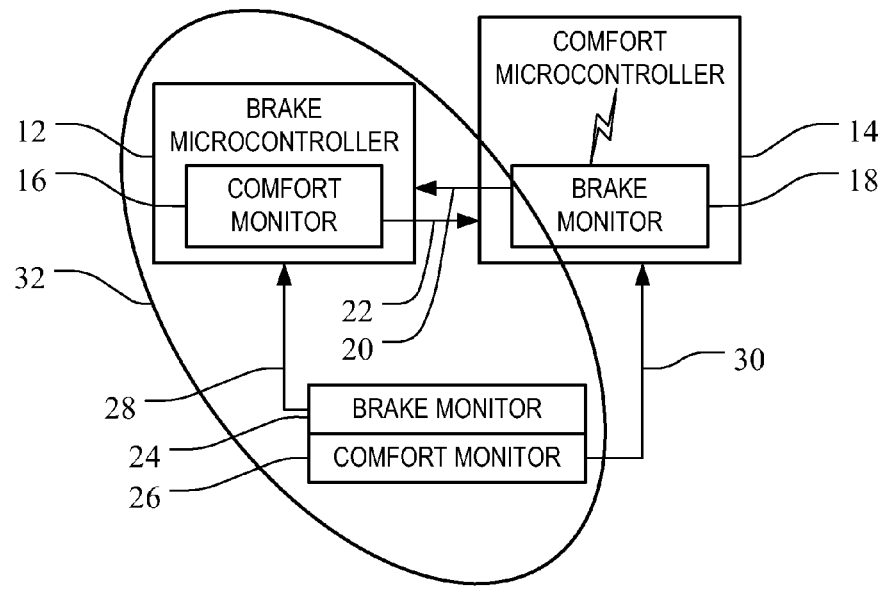
FIG. 5 is an embodiment variant in accordance with FIG. 1 in a third defect case.

The controller system 10 in accordance with FIG. 1 is again shown schematically in FIGS. 4 and 5. However, here a respective defect has occurred in one of the microcontrollers 14, in FIG. 4, and microcontroller 16 in FIG. 5.

It can here be recognised from the representation of the defectiveness of the respective function by the drawn lightning arrows that the unit for the monitoring of the second main function is admittedly also potentially affected, but a secured operation of the second main function is still ensured. The respective elliptical circles 32 in FIG. 4 and 30 in FIG. 5 designate the failure free parts of the controller system 10 which can still be further operated as a defect-free part system. In accordance with the invention, only that part system which is affected by the defect is switched off.

For the special case not shown in FIGS. 4 and 5 that both main functions are identical, that is, for example, both main functions relate to "braking", the system represents a so-called "fault tolerance" system.

The availability can also be increased here by the "double monitoring" since the failure probability of the monitoring function is smaller than that of a single monitoring unit.

Figure 6:
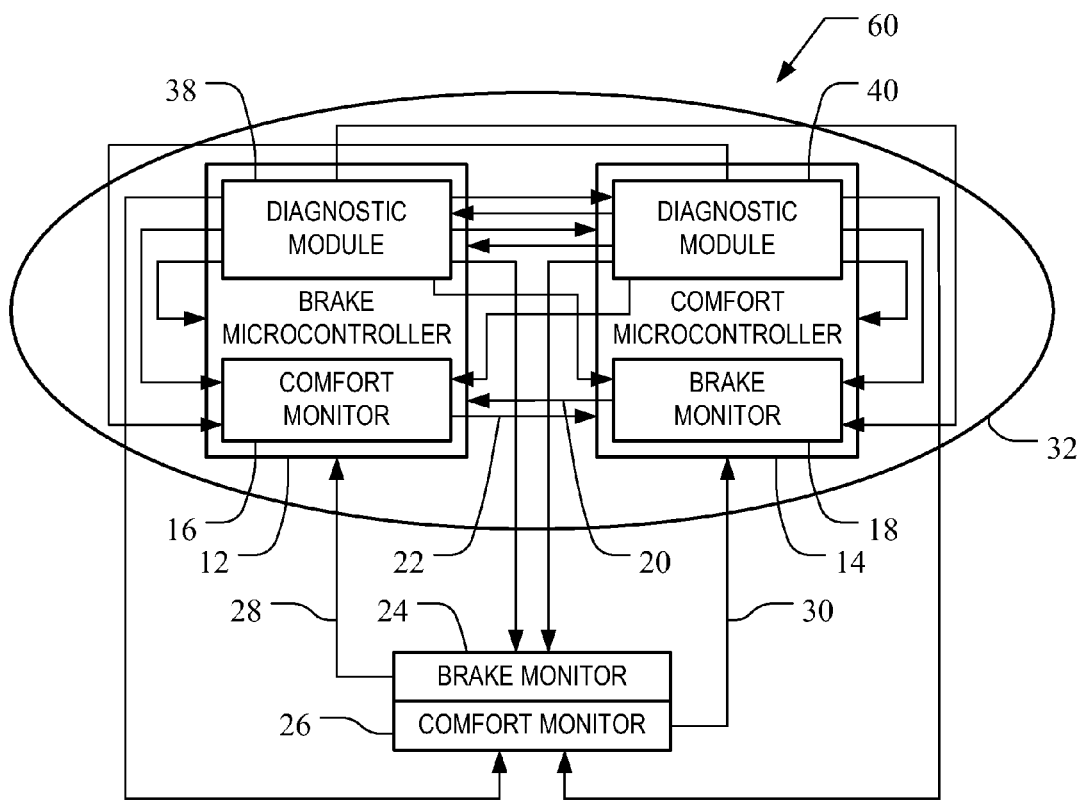
FIG. 6 is a further improved embodiment variant of the embodiment of the invention in accordance with FIG. 1.
Figure 7:
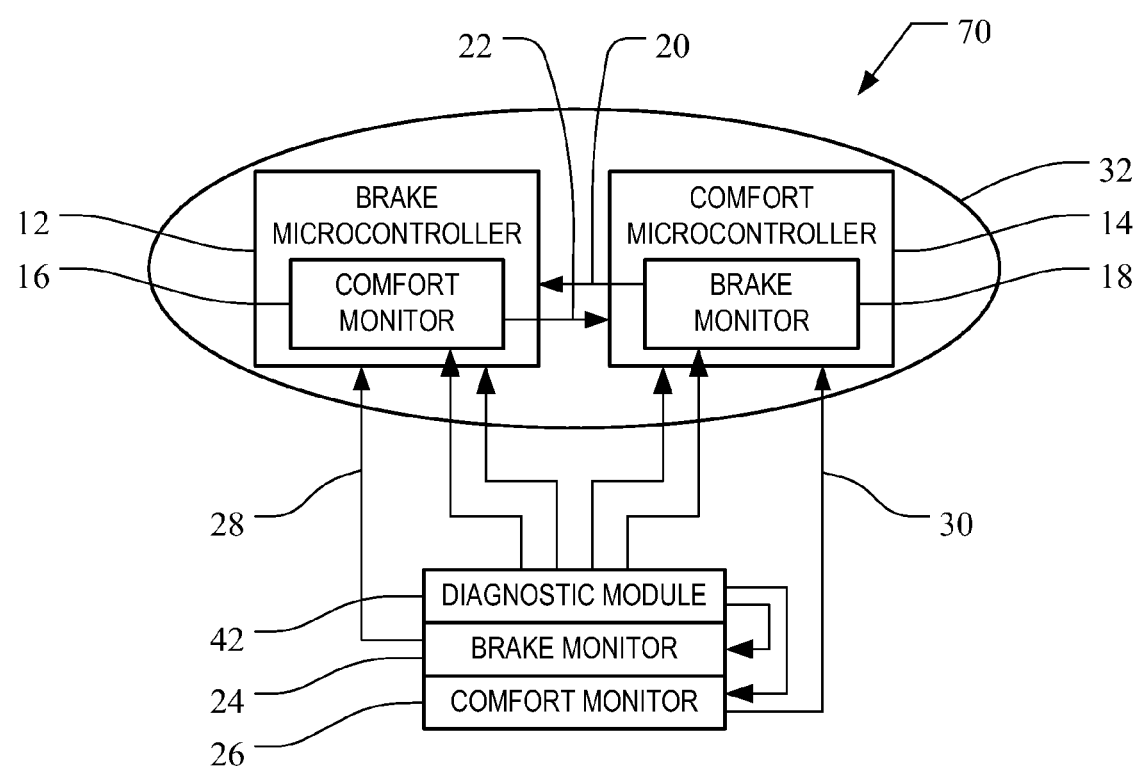
FIG. 7 is an alternative embodiment of the embodiment of the invention in accordance with FIG. 6.

Finally, FIGS. 6 and 7 in turn substantially systematically show controller systems 60 and 70 having the design as was generally shown in FIG. 1. For system 60, however, diagnostic modules 38 and 40 (for system 60) and 42 (for system 70) are additionally integrated and allows an analysis to be prepared on the occurrence of an error and the defective part system optionally to be integrated in the operation of the controller and to be put into function after a previous shutdown.

In the embodiment of system 60 in accordance with FIG. 6, respective diagnostic modules 38 and 40 are provided in the microcontrollers 12 and 14 for the braking and comfort function. The intervention possibility of the diagnostic modules 38 and 40 in the respective system units is shown by the respective arrows. The diagnostic module 40 of the comfort microcontroller 14 can thus, as the respective arrows starting from it show, analyse all the units such as the separate comfort microcontroller 14, but also the braking microcontroller 12, the other diagnostic module, or the four monitor units 16, 18, 24, or 26 and can optionally again put the defective units or part systems back into correct operation.

In the embodiment in accordance with FIG. 7, a diagnostic module 42 is integrated in the external monitoring unit.

The availability of the controller can be increased even further based on the additional diagnosis and repair function of the diagnostic module.

While the above description constitutes the preferred embodiment of the present invention, it will be appreciated that the invention is susceptible to modification, variation and change without departing from the proper scope and fair meaning of the accompanying claims.

The invention claimed is:

1. A controller system in which a plurality of different main functions are integrated, comprising:

a plurality of microcontrollers, each of the microcontrollers being associated with controlling one of the main functions, at least one of the main functions being one of a vehicle comfort function and a vehicle safety function, and at least one monitoring unit implemented for monitoring the plurality of different main functions, and, in the event of a detection of a defective main function among the plurality of different main functions in the controller system, the controller system being configured to deactivate only the defective main function.

2. A controller system in accordance with claim 1, wherein each one of the plurality of different main functions is monitored by one of the at least one monitoring unit arranged outside the microcontroller associated with the one of the plurality of different main functions.

3. A controller system in accordance with claim 2, wherein the microcontrollers mutually check the main functions of other microcontrollers, with the monitoring unit for checking the main function of one of the microcontrollers being arranged on a different microcontroller.

4. A controller system in accordance with claim 2, wherein at least one monitoring unit is located outside all of the microcontrollers.

5. A controller system in accordance with claim 1, wherein a diagnostic unit is provided which can carry out an error analysis and an error processing.

6. A controller system in accordance with claim 5, wherein the diagnostic unit is associated with the at least one monitoring unit.

7. A controller system in accordance with claim 6, wherein the diagnostic unit is associated with the microcontrollers of the main functions.

8. A controller system in accordance with claim 1, wherein a first main function relates to an area of active safety of a vehicle and a second main function relates to an area of the passive safety of the vehicle.

9. A controller system in accordance with claim 8, wherein the first function is related to braking or to driving stability; and that the second function is related to a passenger protection device.

10. A controller in accordance with claim 1, wherein a plurality of functions from an area of active safety of a vehicle are integrated.

11. A controller in accordance with claim 1, wherein a plurality of functions from an area of passive safety of a vehicle are integrated.

12. A controller in accordance with claim 1, wherein at least one function from the area of telematics of a vehicle is integrated with at least one function from an area of passive safety or active safety of a vehicle.

13. A method of controlling a plurality of main functions in a controller system having a controller with a plurality of microcontrollers, each of the microcontrollers being associated with one of the main functions, and at least one monitoring unit implemented for the plurality of the main functions, the method comprising the steps of:

detecting a defective main function in the controller; and
deactivating only the defective main function.

* * * * *

UNITED STATES PATENT AND TRADEMARK OFFICE
CERTIFICATE OF CORRECTION

PATENT NO.         : 8,706,377 B2
APPLICATION NO.    : 12/375758
DATED              : April 22, 2014
INVENTOR(S)        : Weichenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-ninth Day of September, 2015

Michelle K. Lee
*Director of the United States Patent and Trademark Office*